(12) United States Patent
Liu

(10) Patent No.: US 9,635,696 B1
(45) Date of Patent: Apr. 25, 2017

(54) PROVIDING INDICATIONS OF PAIRING BETWEEN WIRELESS DEVICES

(71) Applicant: Bose Corporation, Framingham, MA (US)

(72) Inventor: Peter T. Liu, Ashland, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 14/927,165

(22) Filed: Oct. 29, 2015

(51) Int. Cl.
*H04W 76/02* (2009.01)
*H04W 4/00* (2009.01)

(52) U.S. Cl.
CPC ......... *H04W 76/023* (2013.01); *H04W 4/008* (2013.01)

(58) Field of Classification Search
CPC ............................ H04W 76/023; H04W 4/008
USPC ...................... 455/41.1, 41.2, 41.3
See application file for complete search history.

(56) References Cited

U.S. PATENT DOCUMENTS

| 7,711,861 | B2 | 5/2010 | Yuval | |
|---|---|---|---|---|
| 9,167,611 | B2 | 10/2015 | Breckman et al. | |
| 2008/0113618 | A1* | 5/2008 | De Leon | H04W 12/04 455/41.2 |
| 2010/0121644 | A1* | 5/2010 | Glasser | G10L 17/04 704/273 |
| 2011/0053558 | A1* | 3/2011 | Teague | H04L 9/3273 455/411 |
| 2015/0327309 | A1* | 11/2015 | Gardenfors | H04W 76/023 455/41.2 |

\* cited by examiner

*Primary Examiner* — Tuan Pham
(74) *Attorney, Agent, or Firm* — Fish & Richardson P.C.

(57) ABSTRACT

The technology described in this document can be embodied in a computer-implemented method that includes transmitting, from a first device over a wireless communication channel established between the first device and a second device, one or more signals. The one or more signals include information about an activation pattern for an output device on the second device. The method also includes transmitting, from the first device, at least one control signal to the second device to activate the output device in accordance with the activation pattern, and generating an output signal indicative of the activation pattern for presentation on the first device.

16 Claims, 5 Drawing Sheets

PROVIDING INDICATIONS OF PAIRING BETWEEN WIRELESS DEVICES

TECHNICAL FIELD

This disclosure generally relates to wireless devices connected or paired to one another over short range communication protocols such as Bluetooth®.

BACKGROUND

When a user attempts to wirelessly connect or pair a smartphone to another wireless device (e.g., a Bluetooth® headset), various similar devices may be available in the vicinity. Whether or not the smartphone has paired to the correct device can be determined only after the completion of the pairing process, for example, by playing a sound from the smartphone and checking if the sound is audible on the device. If the smartphone is not paired to the correct device (i.e., the sound is not audible on the device), the current pairing can be terminated and the process repeated with another device. This can be continued until the smartphone is paired to the correct device.

SUMMARY

In one aspect, this document describes a computer-implemented method that includes transmitting, from a first device over a wireless communication channel established between the first device and a second device, one or more signals. The one or more signals include information about an activation pattern for an output device on the second device. The method also includes transmitting, from the first device, at least one control signal to the second device to activate the output device in accordance with the activation pattern, and generating an output signal indicative of the activation pattern for presentation on the first device.

In another aspect, this document features a system that includes one or more transmitters associated with a first device, and a subroutine execution engine that includes one or more processors, and an output device. The one or more transmitters are configured to transmit, over a wireless communication channel established between the first device and a second device, one or more signals comprising information about an activation pattern for an output device on the second device. The one or more transmitters are also configured to transmit at least one control signal to the second device to activate the output device in accordance with the activation pattern. The subroutine execution engine is configured to generate an output signal indicative of the activation pattern. The output device is configured to present a representation of the activation pattern based on the output signal.

In another aspect, this document features one or more machine-readable storage devices storing instructions that are executable by one or more processing devices to perform various operations. The operations include transmitting, from a first device over a wireless communication channel established between the first device and a second device, one or more signals. The one or more signals include information about an activation pattern for an output device on the second device. The operations also include transmitting, from the first device, at least one control signal to the second device to activate the output device in accordance with the activation pattern, and generating an output signal indicative of the activation pattern for presentation on the first device.

Implementations of the above aspects may include one or more of the following features.

The output signal indicative of the activation pattern can be generated prior to finalization of a persistent connection between the first and second devices. The persistent connection can be in accordance with Bluetooth® or Bluetooth® Low Energy (BLE) wireless technology standards. The output signal indicative of the activation pattern can be generated responsive to receiving a user input seeking confirmation of a persistent connection between the first and second devices in accordance with Bluetooth® or Bluetooth® Low Energy (BLE) wireless technology standards. The output device on the second device can include a light-emitting diode (LED), and the activation pattern can include a predetermined blinking sequence for the LED. The activation pattern can be based on identification information received from the second device. At least one of: the control signal and the one or more signals can be generated responsive to receiving a user-input seeking a confirmation of existence of the wireless communication channel between the first device and the second device. A Bluetooth® transmission engine of the first device can be accessed to establish the wireless communication channel. The transmission engine can be accessed via an application, which executes on the first device, and accesses an Application Programming Interface (API) that interfaces between the application and an operating system of the first device. The output signal can cause an illumination source on the first device to be activated in accordance with the activation pattern. The illumination source on the first device can include a light emitting diode (LED), and the output signal can cause the LED to be activated in a predetermined blinking sequence that is based on the activation pattern. The illumination source on the first device can include a display, and the output signal can cause a representation of the activation pattern on the display. The output signal can cause an audible or tactile representation of the activation pattern on the first device. The first device can be a mobile device, and the second device can be at least one of: an audio device and a device configured to measure one or more health parameters. At least one control signal transmitted to the second device can include timing information, such that the at least one control signal activates the output device on the second device in synchrony with the presentation of the output signal on the first device.

Various implementations described herein may provide one or more of the following advantages.

In an environment where multiple wireless devices are available to pair with or connect to a given device, the technology described in this document allows for locating a correct device prior to finalizing a persistent connection between the devices. This can reduce the occurrences of pairing with an unintended device and disrupting any existing pairing of such a device. The technology described herein also allows for confirming that a pairing continues to exist between two devices. This can be used to ensure that information from one device is not unintentionally transmitted to another device. For example, before transmitting information from a wirelessly connected medical device (e.g., a heart rate sensor), the technology described in this document can be used to confirm that the medical device is connected to or paired with the correct device.

Two or more of the features described in this disclosure, including those described in this summary section, may be combined to form implementations not specifically described herein.

The details of one or more implementations are set forth in the accompanying drawings and the description below. Other features, objects, and advantages will be apparent from the description and drawings, and from the claims.

DETAILED DESCRIPTION

Figure 1:
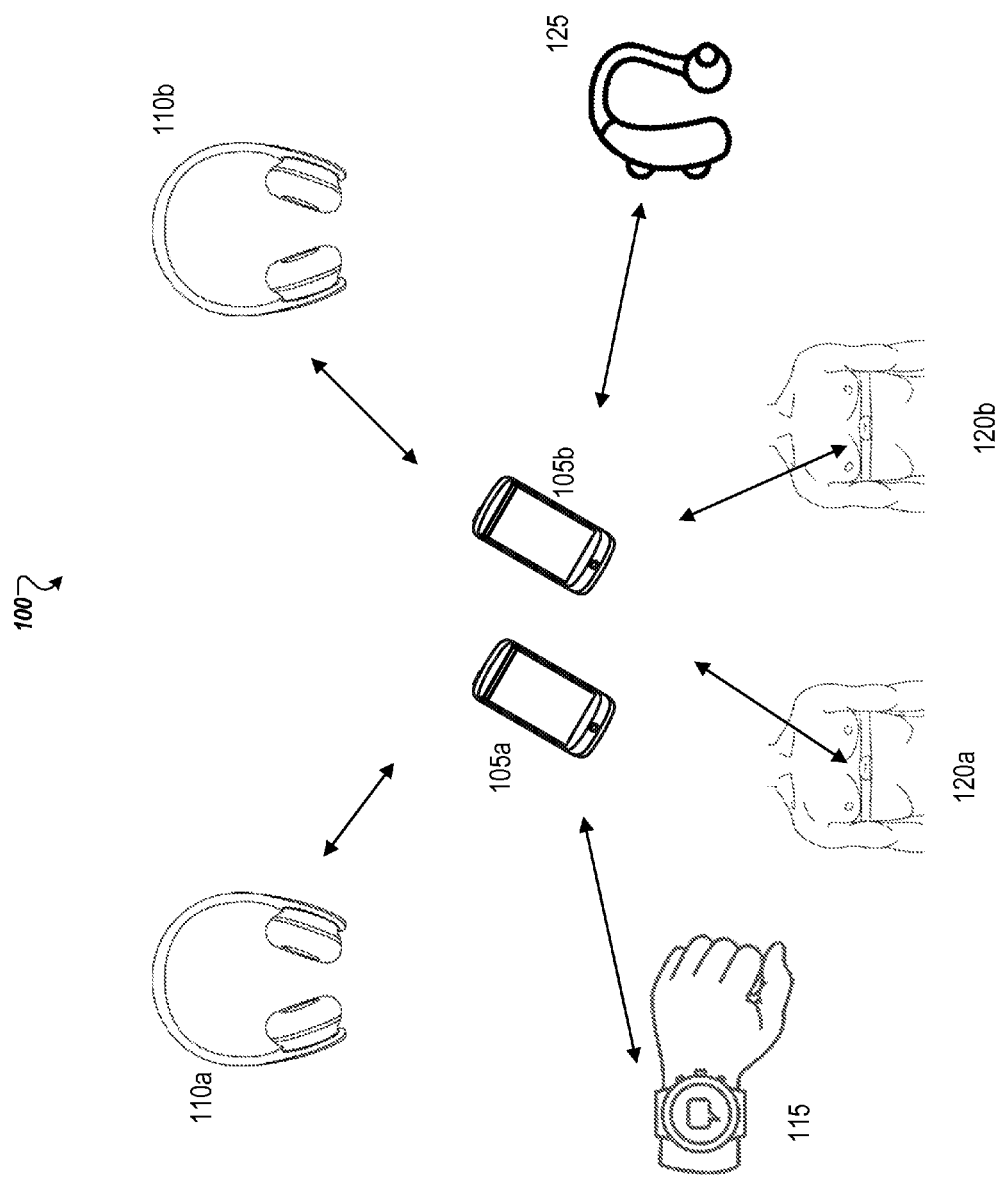
FIG. 1 is a diagram showing an example of an environment where multiple accessories or secondary devices are available for pairing with one or more host devices.

The development of short range wireless communication protocols (e.g., Bluetooth®) have produced various accessories that can be wirelessly connected to one or more host devices such as a smartphone or tablet computer. Such accessories include, for example, various types of audio devices such as wireless-enabled headsets, earphones, earbuds, hearing aids, personal amplifiers, portable speakers, or other devices for reproducing audio. Such accessories also include various wearable devices such as smart watches, fitness trackers, or health-related sensors (e.g., heart rate sensors, wireless blood oxygenation sensors, ECG sensors, or other sensors used in clinical or non-clinical settings). Other examples of accessory devices can include gaming controllers (that connect to a host gaming console), remote controllers, vehicle audio systems, input/out devices such as keyboards, mice, printers, or display devices, and storage devices such as external hard drives.

The accessory devices may be interchangeably referred to herein as secondary devices, while the host devices (e.g., the devices that the accessory devices connect to) may be interchangeably referred to as primary devices. Examples of host devices can include mobile devices such as cellular phones, smartphones, tablet devices, or e-readers. Examples of host devices can also include gaming consoles, media streaming devices, audio systems, or computing devices such as laptop or desktop computers.

In some implementations, the devices provided as examples of secondary devices may also act as a host or primary device. As such, whether a particular device is a primary or secondary device can depend on the nature of the wireless connection. One device that acts as the primary device for one connection may act as a secondary device for another connection. For example, a smartphone can act as a host device for a connection with a wireless-enabled headset, but as a secondary device for a connection with a gaming console (e.g., for being used as a controller for the gaming console). In some implementations, two devices in a wireless connection can be substantially equivalent, and can be interchangeably treated as a host device or secondary device. In some implementations, a device that is a secondary device for one connection can act as a host device for another connection. For example, a wireless-enabled headset may act as a host device in connecting with secondary devices such as a wearable smartwatch.

This document describes connections between host devices and secondary devices primarily using examples of Bluetooth® connections. However, other communication protocols (e.g., Bluetooth® Low Energy (BLE), Near Field Communications (NFC), IEEE 802.1, or other local area network (LAN) or personal area network (PAN) protocols) are within the scope of the technology described herein. Also, setting up a connection between two devices is interchangeably referred to in this document as a pairing. However, the technology may be applied to non-Bluetooth® devices and their connections without deviating from the scope of the disclosure. As such, the term "pairing," as used in this document, is intended to include a pairing-and-connecting process for Bluetooth® devices, a connecting process for BLE devices, and other processes for establishing communication channels between wireless-enabled devices in accordance with corresponding wireless standards.

In some situations, a wireless environment may include multiple secondary devices that are available for pairing with one or more host devices. An example of such an environment 100 is shown in FIG. 1. The example environment 100 includes multiple host devices 105a, 105b (105, in general) and multiple accessory or secondary devices. The secondary devices can include, for example, multiple headsets 110a and 110b (110, in general). Such a situation can occur, for example, in an office setting, where multiple employees may have wireless-enabled headsets 110 connectable to respective phones 105 over Bluetooth®. In such a situation, a person attempting to pair a headset 110 to a phone 105 may be presented with a list of multiple available devices on an interface of the phone. The identification information of the various devices presented on the interface may be insufficient to distinguish between two devices. For example, if several headsets of the same make/model are available, the corresponding description presented on the interface of a host device may be substantially similar or even identical to one another. In such cases, deterministically identifying the correct device can be challenging, and the only way to verify a correct pairing can be to check if the paired device is functioning for the intended purpose after the pairing process has been completed. For example, proper pairing with a particular headset can be verified by playing music on the host device and verifying that the music can be heard on the headset.

In some cases, verification of pairing in the above way can be problematic. For example, if a user attempts to pair a headset 110a with the smartphone 105a, but unintentionally pairs with the headset 110b, playing music on the host device 105a will cause an audio output from the unintended headset 110b. This may potentially cause inconvenience to, or even annoy the user of the unintended headset 110b. In some cases, verifying pairing by checking that the paired device is working for the intended purpose may also be unfeasible. For example, if the secondary device is a heart rate sensor 120a or 120b (120, in general), checking whether the paired device is working for the intended purpose can be challenging and may involve an unreliable process of performing heart-rate enhancing activities and checking whether the measured heart rate actually increases. For some devices such as wirelessly connected blood glucose monitors, checking whether a paired device is working for the intended purpose can even be practically impossible. Similarly, in clinical settings, when the secondary devices include health parameter sensors attached to patients (some of who may be sleeping or even unconscious), verifying pairing by checking whether the paired devices are working for the intended purpose can be unfeasible or impossible.

By using the technology described in this document, an intended secondary device can be quickly identified even before finalization of a persistent connection with the secondary device. In some implementations, this may reduce occurrences of unintentional pairings, and allow for pairing verification in a relatively non-intrusive fashion that does not include checking whether a paired device is working as intended. While the examples above mention headsets 110 and heart rate sensors 120, the technology can be extended for other secondary devices such as smartwatches 115, hearing aids 125, and other secondary devices mentioned above. Further, while FIG. 1 uses smartphones 105 as examples of the host device, other host devices (e.g., the various host devices described above) are within the scope of the technology described herein. Furthermore, some accessories like headphones can also serve as hosts for other secondary devices.

In some implementations, the technology described in this document allows for two paired or connected devices to present correlated indicators (also referred to as a pairing indicator signal) indicative of pairing between the devices. For example, if the paired secondary device (e.g., a headset 110) and the host device (e.g., a smartphone 105) both include a light emitting diode (LED), the two LEDS can be made to blink in a particular pattern, possibly in synchrony, to indicate pairing between the two devices. In some implementations, the pairing indicator signal can be presented via another output device such as a display, speaker, or haptic feedback device. The pairing indicator signal can be presented in the two connected devices using same (or similar) or different output devices. For example, the pairing indication signal on a headset can be presented using an LED, while the corresponding signal is presented on a host smartphone device via a pattern presented on a touchscreen display, a sound sequence played through native speakers of the smartphone, or a pattern of haptic feedback provided via a vibrator mechanism of the smartphone. The process of sharing the pairing indicator signals between two devices is described next using examples of Bluetooth® devices.

Figure 2:
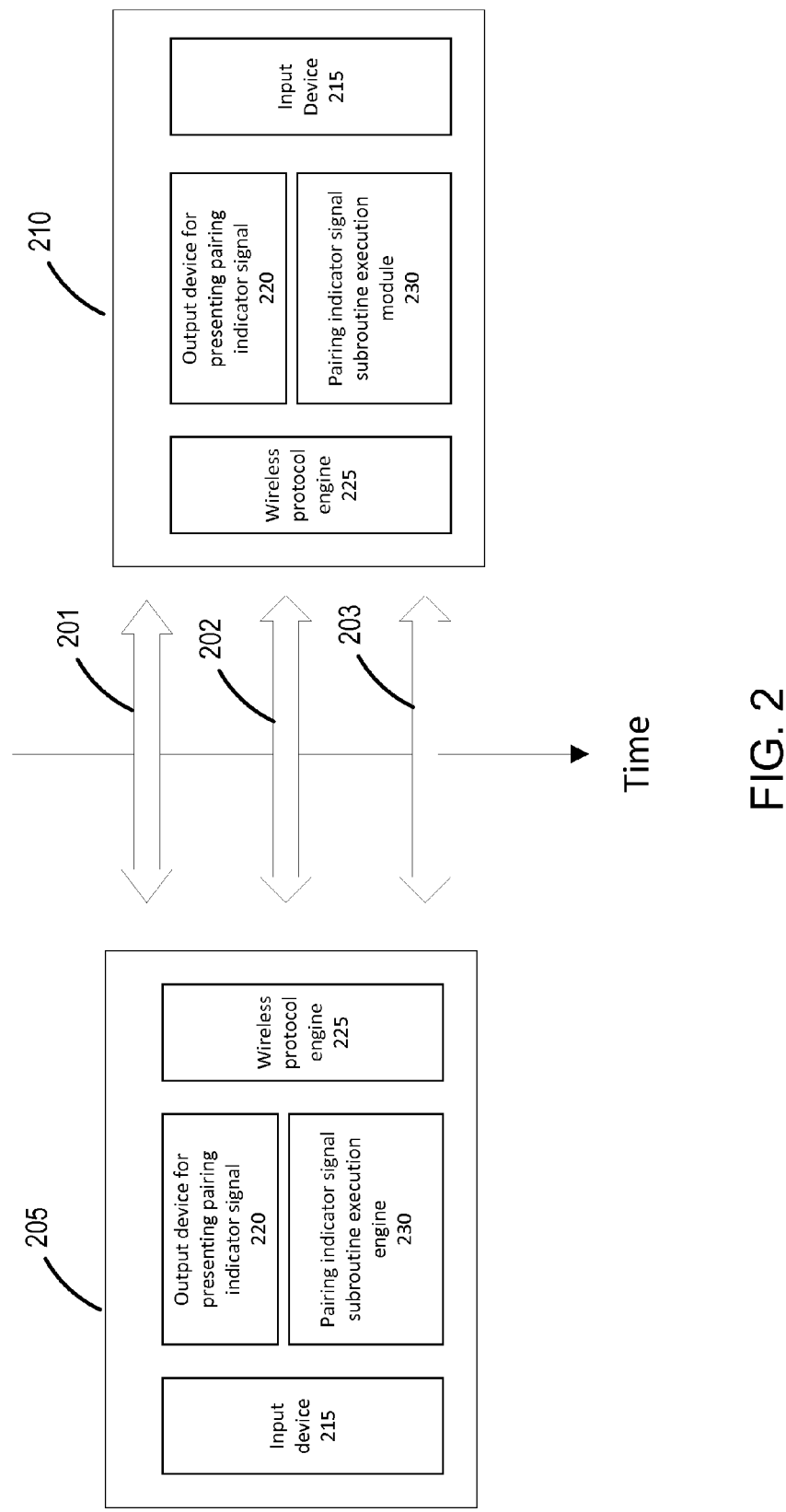
FIG. 2 shows block diagrams of a host device and a secondary device.

FIG. 2 shows block diagrams of a host device 205 and a secondary device 210 that are paired with one another, or attempting to pair with one another. In some implementations, each of the host device 205 and the secondary or accessory device 210 can include one or more input devices 215, one or more output devices 220, a wireless protocol engine 225, and a subroutine execution engine 230 for generating the pairing indication signal. Even though FIG. 2 shows the host device 205 and the secondary device 210 to include the same subunits, the structure of the two devices can also be different. In some implementations, the secondary device 210 can have more or fewer modules, engines, devices or other subunits as compared to the host device 205. The structure or function of one or more modules, engines, devices, or subunits of the host device 205 can be different from the corresponding portion of the secondary device 210.

The input device 215 can include, for example, a touch-enabled display configured to present a user interface. For example, such a user interface can be configured to present on the host device, a list of accessory or secondary devices 210 available for pairing with the host device 205. User input received via the input device can be forwarded to the wireless protocol engine 225 for carrying out a pairing process. The wireless engine can then work in conjunction with the subroutine execution engine 230 to generate the pairing indication signal, which can then be provided to the output device 220 for presentation via the one or more output devices 220. In some implementations, the wireless protocol engine 225 can initiate generating of the pairing indication signal based on, for example, receiving a control signal from another device. For example, the wireless protocol engine 225 of a secondary device 210 may initiate generation of a pairing indication signal based on receiving a control signal from a host device 205.

In some implementations, a pairing indication signal can be generated prior to finalization of a persistent connection between the host device 205 and the secondary device 210. As used in this document, the phrase persistent connection refers to a connection that is used by a device to work for the intended purpose of the device. For example, a persistent connection between a smartphone and wireless-enabled headset facilitates audio streaming from the smartphone to the headset. In another example, a persistent connection between a smartphone and a wireless-enabled heartrate sensor facilitates streaming of heartrate data from the heartrate sensor to the smartphone. On the other hand, a connection which is non-persistent can be used for exchanging preliminary information, but is subject to termination upon exchanging the preliminary information. Consider an example where the host device 205 and the secondary device 210 are both Bluetooth® devices. In such a case, the wireless protocol engines 225 are Bluetooth® engines configured to establish a communication channel between the two devices via a pairing-and-connecting process. For a pair of BLE devices, the communication channel is established using a connecting process. In such cases if the Bluetooth® or BLE connections are used only for exchanging initial information (e.g., identification information) and preliminary information (e.g., pairing indication signals) and terminated thereafter, the connections can be referred to as non-persistent connections. However, if the connections are not terminated subsequent to exchanging the preliminary information such that the connections can be used for the intended purposes of the corresponding devices, the connections can be referred to as persistent connections. This action can also be referred to as a finalization of the connection or a finalization of the pairing procedure.

When the devices are switched on, each device may establish an initial communication channel 201 with one or more of the other Bluetooth® devices in the vicinity. FIG. 2 also illustrates a timeline of establishment of various communication channels between two devices. The initial communication channel 201 can be used, for example, to exchange identification information between the devices. In some implementations, the initial communication channel 201 can be a low bandwidth channel that facilitates exchange of identification information, but does not support high bit rate data that may be exchanged between the devices upon finalization of a persistent connection. The identification information can include, for example, a name of the Bluetooth® or BLE device. A host device, upon receiving such identification information can be configured to present the information on the user interface of the input device 215. The user interface can be launched, for example, upon activation of a Bluetooth® pairing process on the host device. The Bluetooth® pairing and connecting process (or another pairing process such as the BLE connecting process) may be initiated, for example, directly via the operating system of the host device, or using an application that interfaces with the operating system to initiate the Bluetooth® pairing process. In some implementations, the initial communication channels 201 with other Bluetooth® devices in the vicinity may be established upon initiation of the Bluetooth® pairing- and connecting process.

The process of establishment of the initial communication channels 201 may be referred to as Bluetooth® inquiry scan or page scan. During the establishment of the initial communication channels 201, the wireless protocol engine 225 (which for a Bluetooth® device, may be referred to as a Bluetooth® stack) of the host device 205 can be in an "inquiry" mode to detect other Bluetooth® devices in the vicinity. The wireless protocol engine 225 of the secondary device 210 can be in an "inquiry scan" mode to detect inquiries from other devices and respond accordingly. In some implementations, one or more of the host device 205 and the secondary device 210 may provide, via an output device, an indication that such initial communication channels 201 are being established. For example, LEDs on one or both of the host device 205 and the secondary device 210 can be configured to blink in a predetermined fashion during establishment of the initial communication channels 201.

In some implementations, the host device 205 can be configured to present via the user interface displayed on the input device 215, a list of devices discovered via the initial communication channels 201. For example, a smartphone display can be configured to present to a user a list of devices available for pairing. In some implementations, the host device 205 can be configured to initiate generation of a pairing indication signal upon a partial selection of a particular accessory, wherein the partial selection does not finalize a persistent connection between the secondary device and the host device. Rather, the partial selection can be such that upon removal of the partial selection any pairing or connection between the host and secondary devices is terminated. An example of such partial selection includes a hovering operation that may be implemented using the input device 215. In general, such a partial selection or hovering includes preliminarily selecting an input without completing an action that indicates completion of the selection. Moving away from the partial selection without completing the selection can be referred to as an unhovering operation.

Such hovering and unhovering operations may be implemented in various ways. For example, if the input device is a touchscreen, the hovering operation may be implemented, for example, by pressing (or touching) and holding (but not releasing), using a finger or stylus, a representation of the secondary device on the user interface presented on the touchscreen. In such cases, simply moving the finger or stylus away from the preliminary selection without releasing may constitute the corresponding unhovering operation, and releasing can constitute a completion of the selection. When the input device 215 includes a three-dimensional (3D) sensing surface, the hovering operation may be implemented, for example, by maintaining a threshold distance between a stylus or finger and the representation of the secondary device on the user interface presented on the 3D sensing surface. In such cases, moving the finger or stylus away without touching the surface can constitute the corresponding unhovering, while touching the surface can constitute completion of the selection. When the input device 215 includes a pressure sensitive screen, the hovering operation may be implemented, for example, by lightly touching (but not pressing on) the representation of the secondary device on the user interface using a stylus or finger. In such cases, moving the finger or stylus away without pressing can constitute unhovering, and pressing on the screen can complete the selection. Other modes of input substituting or supplementing the hovering/unhovering process described above can also be used. In one example, the functionalities of the hover/unhover operations can be implemented via appropriate voice inputs. In some implementations, motion sensors provided in a device can also be used. For example, moving the device in one particular manner can be used to indicate a hover operation, and moving it in another manner can be used to indicate an unhover operation. In some implementations, partial/final selections can also be made using dedicated controls (e.g., buttons or switches provided on a device).

In some implementations, pairing indication signals can be generated at the host device and a particular secondary device upon a partial selection of the particular secondary device, for example, via a hovering operation. For example, once a user hovers over the representation of the particular secondary device (as presented on the user interface of the input device 215), the host device 205 may establish a preliminary communication channel 202 with the corresponding secondary device 210. In some implementations, the preliminary communication channel 202 can be substantially similar to the initial communication channel 201 established for exchanging identification information. For example, the preliminary communication channel 202 can be a low bandwidth channel that facilitates exchange of information related to the pairing indication signals, but does not support high bit rate data that may be exchanged between the devices upon finalization of a persistent connection.

In some implementations, the preliminary communication channel 202 can be established, for example, using a serial port profile (SPP) of a Bluetooth® stack. Once the preliminary communication channel 202 is established between the host device 205 and the secondary device 210, the host device can be configured to send information representing an activation pattern of an output device. The activation pattern for the output device represents the pairing indication signal for the two devices. For example, for cases where the pairing indication signal is output via LEDs on the two devices, the activation pattern can represent a blinking pattern or blinking sequence for the LEDs. In some implementations, the activation pattern is sent in the form of a subroutine that is executable by the subroutine execution engine 230 to generate the pairing indication signal for presentation on the corresponding output device 220. In some implementations, the subroutine for the host device execution engine 230 is different from the subroutine for the secondary device execution engine 230. This can happen, for example, when the output devices presenting the pairing indication signal are different in the host and secondary devices.

In some implementations, the host device 205 sends a control signal to the secondary device, for example, over the preliminary communication channel 202, to use the information representing the activation pattern in generating the pairing indication signal. For example, the control signal can cause the subroutine execution engine 230 of the secondary device 210 to use the subroutine representing the activation pattern (as received from the host device 205) to cause the corresponding output device (e.g., an LED) 220 to generate the pairing indication signal. The subroutine execution engine 230 of the host device 205 can also invoke a corresponding subroutine to generate the pairing indication signal at the host device 205 via the corresponding output device 220. The generation of the same (or correlated) pairing indication signal on the two devices (possibly in synchrony, or within a threshold time gap from one another) can identify the host device 205 and the secondary device 210 as potential candidates for pairing. The user, upon receiving such identification, can complete the selection of the secondary device 210 to initiate completion of the pairing between the two devices. The pairing can be completed, for example, via an establishment of a persistent connection or persistent channel 203 that supports streaming of data for the intended purpose of the pairing. For example, for a pairing between a smartphone and a Bluetooth® headset, the persistent channel 203 can support streaming of audio data from the smartphone to the headset, and may also include a return channel for receiving one or more control signals (e.g., volume control signals) from the headset to the smartphone. In some implementations, upon establishment of the persistent channel 203, the host device may transmit a control signal to the secondary device, such that the control signal causes the output device 220 of the secondary device 210 to stop presenting the pairing indicator signal. In some implementations, the information representing the activation pattern can include information on a predetermined time period for which the pairing indication signal is to be generated. Various other control signals can also be exchanged between the host devices to control the nature of the pairing indication signals. Such control signals can be used, for example, to change activation patterns, insert pauses between two pairing indication signal sequences, or specify a predetermined number of times the pairing indication signal is to be generated.

If the user, upon receiving identification of the host and secondary devices, realizes that the secondary device 210 is not the intended secondary device, the user can perform an unhover operation to refrain from completing the selection and establishing the persistent channel 203 between the host device 205 and the unintended secondary device. The unhover operation can cause, for example, another control signal to be sent from the host device to the secondary device, wherein the control signal causes the output device 220 of the secondary device 210 to stop presenting the pairing indicator signal. In some implementations, the above techniques provide a deterministic identification of the devices to be paired prior to finalization of a persistent connection, which in turn may improve the pairing process by reducing or substantially eliminating the chances of pairing with an unintended device.

The information representing the activation pattern can be provided in various ways. In some implementations, the information representing the activation pattern can be provided by the host device 205 based on pre-stored data. In some implementations, the information representing the activation pattern can be generated by the host device 205 based on identification information received from the accessory or secondary device 210. For example, the identification information can include information on make and/or model of the secondary device 210, and the activation pattern can be generated based on such information to provide, for example a "signature" blinking pattern associated with the particular make/model. This way, pairing indication signals specific to one or more of accessories, makes, models etc. may be used.

In some implementations, a predetermined ruleset can be used to determine whether a host device or a secondary device dictates the activation pattern. For example, for a pair of Bluetooth® devices, one of the host or the accessory device acts as the master device, while the other acts as the slave device. In some such implementations, the master device can be configured to dictate the activation pattern, unless, for example, the slave device negotiates the right to dictate the activation pattern, and the master device accepts. In one example, when two host devices are connected to one secondary device, the secondary device may act as the master device and dictate the activation pattern. In another example, when multiple secondary devices are connected to one host device, the host device may act as the master device and dictate the activation pattern. A network of Bluetooth® devices connected to one another is referred to as a piconet. In some implementations, one device (which may be a host device or a secondary device) that acts as the master device for a particular piconet may dictate the activation pattern for all the devices on that piconet. In some implementations, one device may be connected to multiple piconets. A network of multiple piconets may be referred to as a scatternet. In such cases, the activation pattern for one piconet may be used in one or more of the other piconets.

In some implementations, the technology described herein may also be used in confirming reconnection of a previously paired (but currently disconnected) secondary device with a host device. In such cases, when a user turns on the secondary device (e.g., a headset), the secondary device can send a paging signal to a host device. The paging signal can be transmitted, for example, using a channel substantially similar to the initial communication channel 201 described above. Upon receiving a response from the host device, the secondary device can establish another communication channel (e.g., one of the channels 202 and 203 described above) with the host device. This channel can be established, for example, using an SPP of a Bluetooth® stack. The secondary device can then use one of the established communication channels to send information about an activation pattern to the host device. In some implementations, the secondary device can separately send a control signal to the host device, for example, a communication channel 202 or 203, to instruct the host device to use the information representing the activation pattern in generating a pairing indication signal. For example, the control signal can cause the subroutine execution engine 230 of the host device 205 to use the subroutine representing the activation pattern (as received from the secondary device 210) to cause the corresponding output device (e.g., an LED) 220 to generate the pairing indication signal. The subroutine execution engine 230 of the secondary device 210 can also invoke a corresponding subroutine to generate the pairing indication signal at the secondary device 210 via the corresponding output device 220. The generation of the same (or correlated) pairing indication signals on the two devices (possibly in synchrony, or within a threshold time gap from one another) can indicate that the secondary device is once again connected with the host device. In some implementations, the secondary device 210 may send a separate control signal to the host device 205 instructing the subroutine execution engine 230 of the host device 205 to cease generating the pairing indication signal.

In some implementations, the technology described in this document can be used in confirming an existing pairing between two devices. This can be done, for example, by initiating a confirmation request from a paired device (e.g., the host device 205). The confirmation request can be initiated, for example, using a control provided, for example, on a user interface of the host device. In some implementations, the confirmation request can be device-specific, and entail a point-to-point transmission from one device to another. In some implementations, the confirmation request can include transmissions to multiple devices, such as a piconet broadcast to all paired and connected devices. In some implementations, initiating the confirmation request can cause transmission of information representing an activation pattern to one or more paired devices. In some implementations, initiating the confirmation request can also cause transmission of controls signals to the one or more paired devices such that the corresponding subroutine execution engines of the paired devices can use the activation pattern to generate pairing indication signals via the corresponding output devices.

Figure 3A:
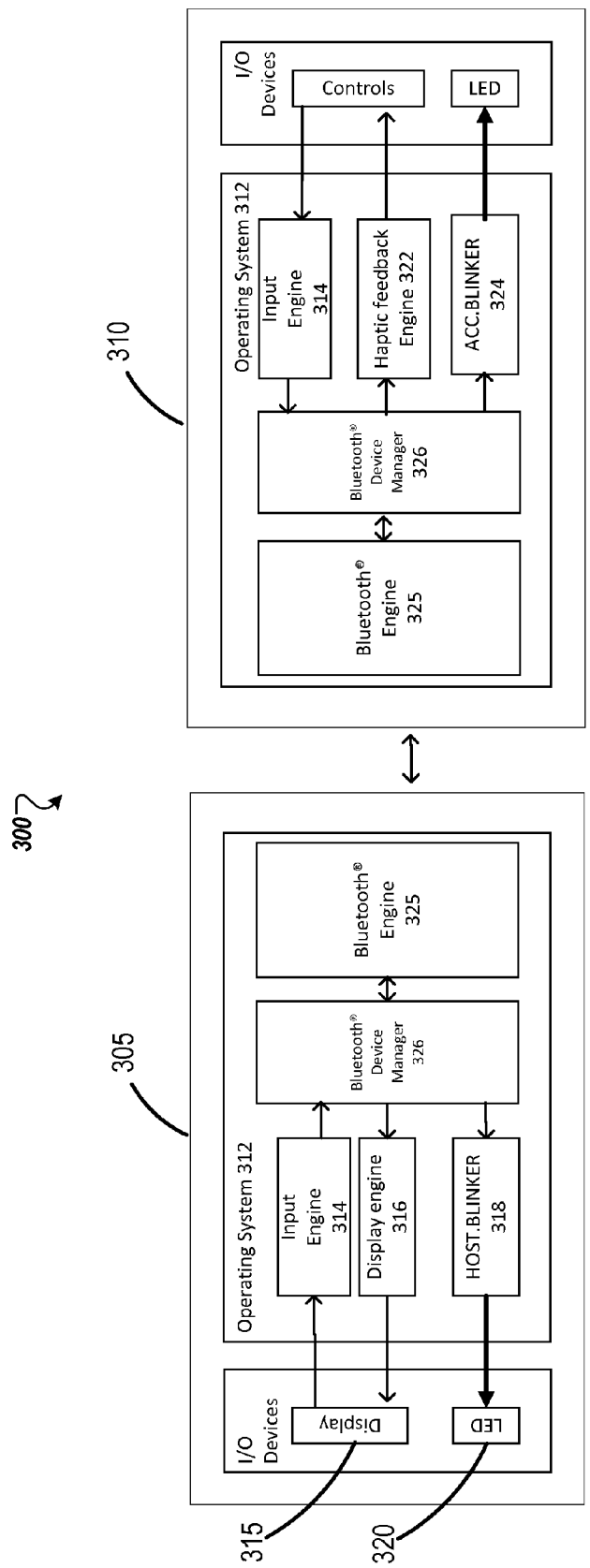
FIGS. 3A-3C show block diagrams of Bluetooth® devices that can use the technology described herein.
Figure 3B:
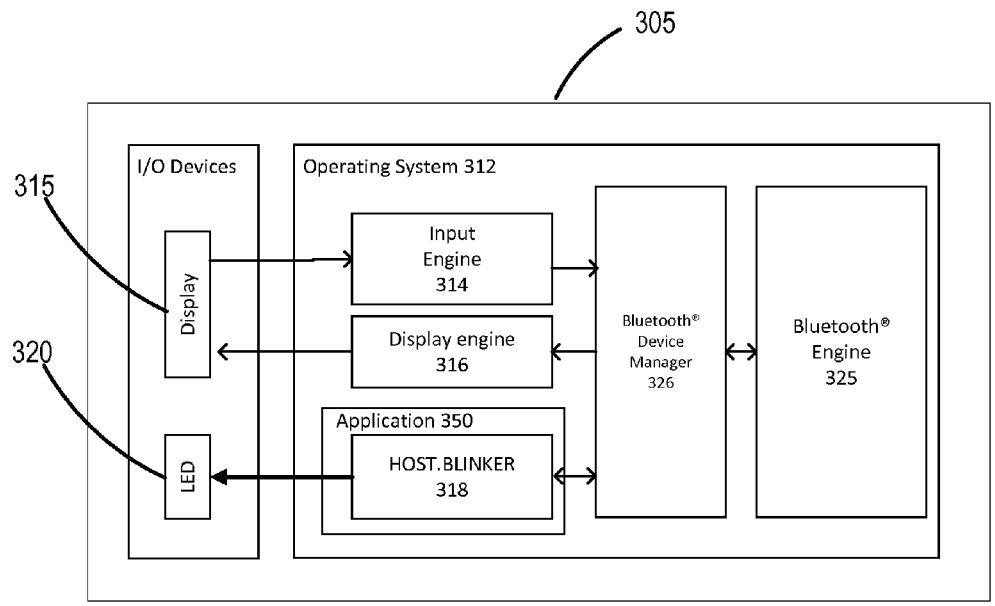

The techniques described above can be implemented using various combination of hardware and software modules. For example, generation of the pairing indication signals can be facilitated directly via the operating system of the host device, or using an application that interfaces with the operating system to initiate the process. FIGS. 3A-3B illustrate various examples of such combinations. FIG. 3A shows the example of a host Bluetooth® device 305 and a Bluetooth® secondary device 310. In this example, the Bluetooth® engines 325 represent the wireless protocol engines for the devices. In this example, the host device 305 includes an input engine 314 and a display engine 316 that interface between the touch-enabled display 315 and the Bluetooth® engine 325. The host device 305 may also include a Bluetooth® device manager 326 for managing multiple Bluetooth®devices associated with the host device 305. The input engine, 314, display engine 316, Bluetooth® engine 325, and the Bluetooth® device manager 326 are implemented as portions of the operating system 312 of the host device 312. In the example of FIG. 3A, the subroutine execution engine (referred to as HOST.BLINKER 318) that is configured to cause the LED 320 to present the pairing indication signal is also implemented as a portion of the operating system 312. On the secondary device side, the subroutine execution engine (represented as ACC.BLINKER 324) is also implemented as a portion of the operating system 312. In this particular example, the operating system 312 of the secondary device further includes a haptic feedback engine 322 that corresponds with the I/O devices to provide haptic outputs (which, in some cases, may be used to present the pairing indication signal).

In some implementations, the generation of the pairing indication signals can be facilitated using an application installed on the device. The application can be associated with a particular type of accessory or secondary devices, and configured to facilitate generating pairing indication signals when the host device pairs with or attempts to pair with a secondary device of that particular type. For example, the application can be provided by a manufacturer of headsets, and may be used in generating pairing indication signals during the process of pairing with headsets from the particular manufacturer. The application (which may also be referred to as an "app") may be made available for download on to the host device from a repository (e.g., an online retail shop) accessible to the host device.

Figure 3C:
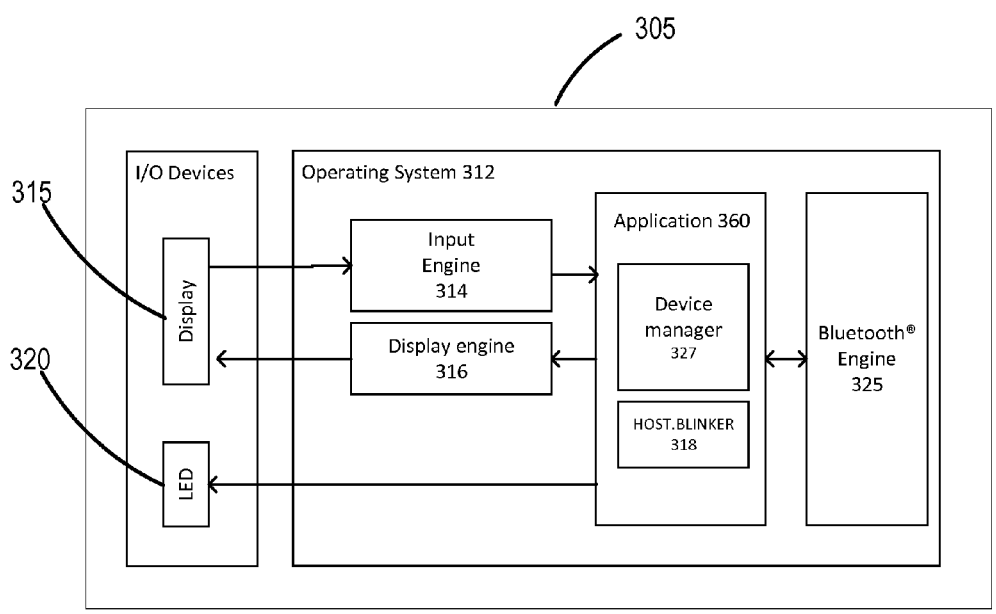

In the example of FIG. 3B, the HOST.BLINKER subroutine execution engine 318 is implemented as a part of an application 350. In the example of FIG. 3C, a device manager 327 is implemented together with the HOST-.BLINKER subroutine execution engine 318 as a part of an application 360. In some implementations, the device manager 327 can be configured to implement the functionalities of the Bluetooth®device manager 326. The applications 350 or 360 can be configured to control the LED 320 to present the pairing indication signal. The application 350 or 360 may interface with the Bluetooth® engine 325 (in some cases, through the Bluetooth®device manager 326, as illustrated in FIG. 3B) to facilitate generation of the pairing indication signals. This may be done, for example, via an application programming interface (API) that allows the applications to communicate with the Bluetooth® engine 325 associated with the operating system 312.

Figure 4:
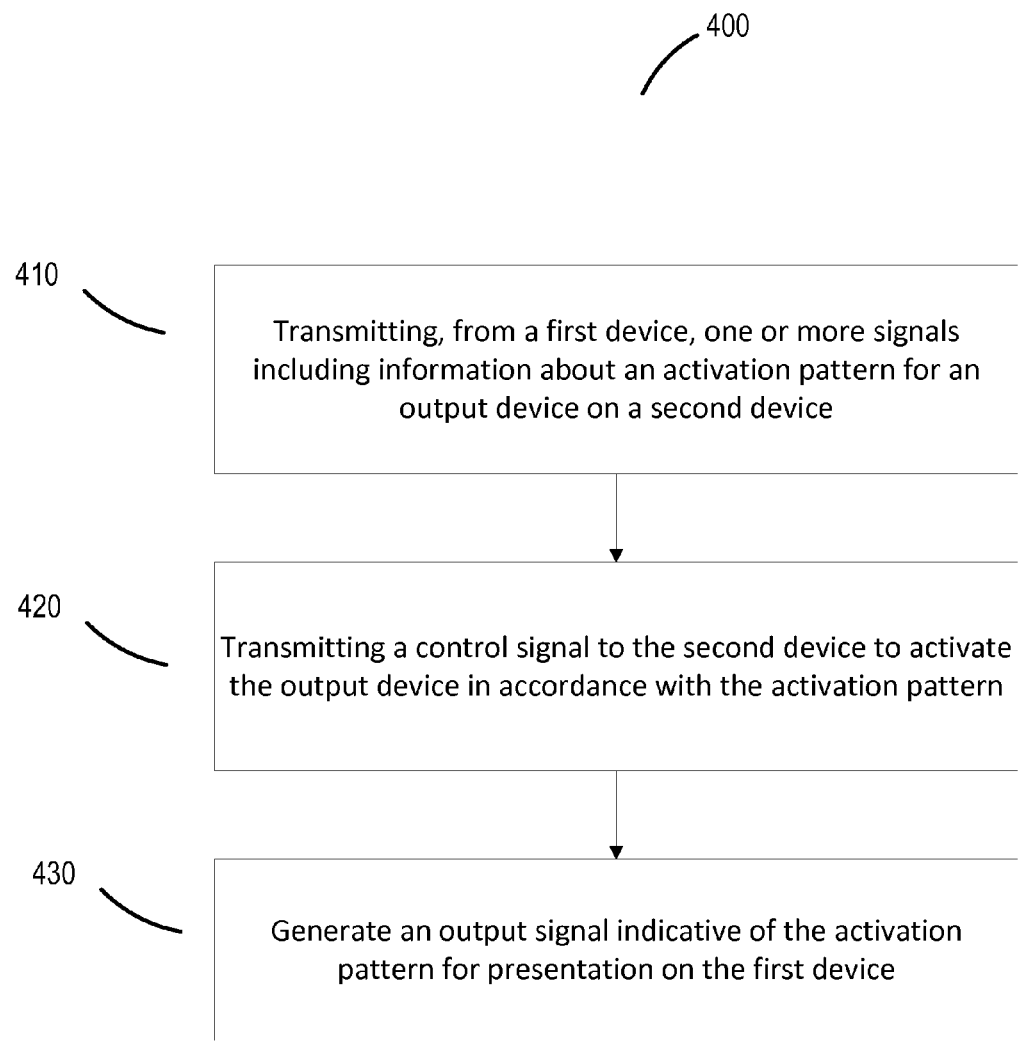
FIG. 4 is a flowchart of an example process for generating an indication of pairing between two devices.

FIG. 4 shows a flowchart of an example process 400 for generating an indication of pairing between two devices. The process 400 can be implemented, for example, on a host device or a secondary device described above with reference to FIG. 1. For example, at least a portion of the process 400 may be implemented using the wireless protocol engine 225 and/or the subroutine execution engine 230 described above with reference to FIG. 2.

The operations of the process 400 includes transmitting, from a first device, one or more signals including information about an activation pattern for an output device on a second device (410). In some implementations, the first device is a host device and the second device is a secondary or accessory device. In some implementations, the first device is a master device in a Bluetooth® or BLE piconet or scatternet. A host or a secondary device can be configured to act as a master device. In some implementations, the information about the activation pattern can include a subroutine executable by an execution module (e.g., the execution engine 230) of the second device to activate the illumination source on the second device. For example, if the output device on the second device includes a light-emitting diode (LED), and the information about the activation pattern can include a predetermined blinking sequence for the LED. The information about the activation pattern can be generated based on, for example, pre-stored information on the first device, or identification information received from the second device.

In some implementations, the one or more signals including information about the activation pattern can be transmitted (e.g., using a transmitter associated with the first device) over a wireless communication channel established between the first device and a second device. The wireless channel can be substantially similar to the wireless channels 201 or 202 described above with reference to FIG. 2. In some implementations, a Bluetooth® transmission engine of the first device may be accessed to establish the wireless communication channel. The transmission engine can be accessed, for example, directly via the operating system, or via an application, which executes on the first device to communicate with the operating system through an Application Programming Interface (API).

The operations of the process 400 also includes transmitting, from the first device, at least one control signal to the second device to activate the output device in accordance with the activation pattern (420). In some implementations, the control signal (and/or the one or more signals including information about an activation pattern) can be generated, for example, responsive to receiving a user-input seeking a confirmation of existence of the wireless communication channel between the first device and the second device. The one control signal can be substantially similar to the control signals sent from the host device 205 to the secondary device 210 (as described above with reference to FIG. 2) to generate the pairing indication signal at the secondary device. The control signal can be used for, for example, initiating presentation of the pairing indication signal, ceasing a presentation of the pairing indication signal, modifying the pairing indication signal, or providing one or more parameters (e.g., time duration) associated with the pairing indication signal.

Operations of the process 400 further includes generating an output signal indicative of the activation pattern for presentation on the first device (430). In some implementations, the output signal can be generated prior to finalization of a persistent connection between the first and second devices. In some implementations, the output signal can be generated responsive to receiving a user input seeking confirmation of a pairing between the first and second devices. The pairing (and connecting) between the first and second devices can be in accordance with Bluetooth® or BLE wireless technology standards. In some implementations, the output signal causes an output device (e.g., an illumination source such as an LED) to be activated in accordance with the activation pattern. For example, the output signal may cause an LED on the first device to be activated in accordance with a blinking sequence derived from or dictated by the activation pattern. In some implementations, the at least one control signal can include timing information, such that the output device on the second device is activated in synchrony (or in an otherwise predetermined timing relation) with the presentation of the output signal on the first device The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

In some implementations, an API (e.g., a RESTful API with JSON/XML output) and/or an embeddable plug-in, can be configured to interact with the wireless protocol engine 225. The API or plug-in can be configured to allow third-party websites and applications to be powered by the wireless protocol engine 225.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

Other embodiments not specifically described herein are also within the scope of the following claims. Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. A computer-implemented method comprising:
   transmitting, from a wireless-enabled headset over an initial wireless communication channel established between the wireless-enabled headset and a host device, one or more signals comprising information about an activation pattern for corresponding output devices on the wireless-enabled headset and the host device, wherein the activation pattern represents a make and model of the wireless-enabled headset;
   receiving, from the host device over the initial wireless communication channel, at least one control signal configured to activate the corresponding output device on the wireless-enabled headset in accordance with the activation pattern; and
   generating, using the output device on the wireless-enabled headset, an output signal indicative of the activation pattern.

2. The method of claim 1, wherein the output signal indicative of the activation pattern is generated prior to finalization of a persistent connection between the wireless-enabled headset and the host device.

3. The method of claim 2, wherein the persistent connection is in accordance with Bluetooth® or Bluetooth® Low Energy (BLE) wireless technology standards.

4. The method of claim 1, wherein the output signal indicative of the activation pattern is generated responsive to receiving, from the host device, indication of a user input seeking confirmation of a persistent connection between the wireless-enabled headset and the host device in accordance with Bluetooth® or Bluetooth® Low Energy (BLE) wireless technology standards.

5. The method of claim 1, wherein the initial wireless communication channel is established by accessing a Bluetooth® transmission engine of the host device, wherein the Bluetooth® transmission engine is accessed via an application, which executes on the host device, and accesses an Application Programming Interface (API) that interfaces between the application and an operating system of the host device.

6. The method of claim 1, wherein the output signal causes an illumination source on the wireless-enabled headset to be activated in accordance with the activation pattern.

7. The method of claim 6, wherein the illumination source on the wireless-enabled headset comprises a light emitting diode (LED), and the output signal causes the LED to be activated in a predetermined blinking sequence that is based on the activation pattern.

8. The method of claim 1, wherein the corresponding output device on the host device comprises a display, and a representation of the activation pattern is presented on the display in response to receiving the activation pattern from the wireless-enabled headset.

9. The method of claim 1, wherein the output signal causes an audible or tactile representation of the activation pattern on the wireless-enabled headset.

10. The method of claim 1, wherein the host device is a mobile device.

11. The method of claim 1, wherein the at least one control signal received from the host device comprises timing information, such that the corresponding output device on the host device is activated in accordance with the activation pattern in synchrony with a presentation of the output signal on the wireless enabled headset.

12. A system comprising:
    a wireless-enabled headset that includes one or more transceivers configured to:
    transmit, over an initial wireless communication channel established between the wireless-enabled headset and a host device, one or more signals comprising information about an activation pattern for corresponding output devices on the wireless-enabled headset and the host device, wherein the activation pattern represents a make and model of the wireless-enabled headset, and receive, from the host device over the initial wireless communication channel, at least one control signal configured to activate the corresponding output device on the wireless-enabled headset in accordance with the activation pattern;

a subroutine execution engine comprising one or more processors, configured to generate an output signal indicative of the activation pattern; and an output device configured to present a representation of the activation pattern based on the output signal.

13. The system of claim 12, wherein the output signal indicative of the activation pattern is generated prior to finalization of a persistent connection between the wireless-enabled headset and the host device.

14. The system of claim 12, wherein the subroutine execution engine is configured to generate the output signal responsive to receiving, from the host device, indication of a user input seeking confirmation of existence of a persistent connection between the wireless-enabled headset and the host device in accordance with Bluetooth® or Bluetooth® Low Energy (BLE) wireless technology standards.

15. One or more machine-readable storage devices storing instructions that are executable by one or more processing devices to perform operations comprising:

transmitting, from a wireless-enabled headset over an initial wireless communication channel established between the wireless-enabled headset and a host device, one or more signals comprising information about an activation pattern for corresponding output devices on the wireless-enabled headset and the host device, wherein the activation pattern represents a make and model of the wireless-enabled headset;

receiving, from the host device over the initial wireless communication channel, at least one control signal configured to activate the corresponding output device on the wireless-enabled headset in accordance with the activation pattern; and generating, using the corresponding output device on the wireless-enabled headset, an output signal indicative of the activation pattern.

16. The one or more machine-readable storage devices of claim 15, wherein the output signal indicative of the activation pattern is generated prior to finalization of a persistent connection between the wireless-enabled headset and the host device.

* * * * *